US012353429B2

(12) United States Patent
Bos et al.

(10) Patent No.: US 12,353,429 B2
(45) Date of Patent: Jul. 8, 2025

(54) VIRTUAL MACHINE FOR ETL TRANSFORMATIONS

(71) Applicant: SAP SE, Walldorf (DE)

(72) Inventors: Daniel Bos, Beijing (CN); Qing Liu, Beijing (CN); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 17/987,961

(22) Filed: Nov. 16, 2022

(65) Prior Publication Data

US 2024/0160637 A1 May 16, 2024

(51) Int. Cl.
*G06F 16/25* (2019.01)
*G06F 8/41* (2018.01)
*G06F 9/30* (2018.01)
*G06F 9/455* (2018.01)

(52) U.S. Cl.
CPC ............ *G06F 16/254* (2019.01); *G06F 8/447* (2013.01); *G06F 9/30101* (2013.01); *G06F 9/45504* (2013.01)

(58) Field of Classification Search
CPC .... G06F 16/254; G06F 8/447; G06F 9/30101; G06F 9/45504
See application file for complete search history.

(56) References Cited

U.S. PATENT DOCUMENTS

| 6,772,413 | B2 * | 8/2004 | Kuznetsov | G06F 40/154 |
| | | | | 715/236 |
| 10,552,213 | B2 * | 2/2020 | Lloyd | G06F 9/5038 |
| 2020/0264877 | A1 * | 8/2020 | Lichtenau | G06F 9/30032 |
| 2021/0349743 | A1 * | 11/2021 | Panchomarthi | H04L 9/0819 |
| 2023/0144349 | A1 * | 5/2023 | Kodavati | G06F 16/214 |
| | | | | 707/602 |

FOREIGN PATENT DOCUMENTS

JP          5419325 B2 *   2/2014   ............... G06F 8/40

* cited by examiner

*Primary Examiner* — Ken Hoang
(74) *Attorney, Agent, or Firm* — Buckley, Maschoff & Talwalkar LLC (57) ABSTRACT

Provided are systems and methods for transforming data from a format of a source system into a format of a target system based on a dedicated virtual machine. In one example, a method may include storing programming code which comprises logic for transforming data from a source system to a target format of a target system, compiling the programming code into bytecode, generating a work order which includes a payload of data from the source system and the bytecode, reading the work order via a virtual machine and executing the bytecode on the payload of data via the virtual machine, wherein the virtual machine transforms the payload of data from the source format to the target format based on the bytecode, and loading the transformed payload of data into the target system.

20 Claims, 10 Drawing Sheets

Instruction Set 210

Move <destination>, <source>.

Copy <source> into <destination>.

Loop <destination>, <source>, <label>.

Jump <label>.

New <destination>, <type>.

Emit <source>.

Return

Data Types 220

Scalar
 'bool'
 'int64'
 'uint64'
 'float64'
 'string'

Structure
 Value: Scalar
 Value: Structure
 Value: Table

Table
 Element: Structure
 Element: Scalar

FIG. 2B

```
                 Programming Model          230
                 (Transformation Logic)

{
   "headerObject": {
      "kind": "entity",
      "elements": {
         "id": {
            "type": "UUID"
         },
         "fieldA": {
            "type":  "String",
            "length": 64
         },
         "items": {
            "type":   "Composition",
            "target": "businessObject"
         }
      }
   },
   "businessObject": {
      "kind": "entity",
      "elements": {
         "id": {
            "type":   "String",
            "length": 64
         },
         "parent": {
            "type":   "Association",
            "target": "headerObject",
            "on":     "id"
         }
      }
   }
}
```

FIG. 2C

```
         Generated Bytecode                      240
         (Transformation Logic)

move     r1, data
         move     r2, r1
loop1:
         loop     r3, r2, exit2
         new      r4, "headerObject"
         movec    r4, r3
         move     [r4, id], uuid()
         move     r5, [r3, items]
loop3:
         loop     r6, r5, exit4
         new      r7, "businessObject"
         movec    r7, r6
         move     [r7, parent_id], [r4, id]
         emit     r7
         jump     loop3
exit4:
         emit     r4
         jump     loop1
exit2:
         ret
```

VIRTUAL MACHINE FOR ETL TRANSFORMATIONS

BACKGROUND

In computing, extract, transform, and load (ETL) is a three-phase process that is able to extract data from a source system and load it into a target system. Before loading the data from the source system into the target system, the ETL process may transform the data so that it adheres to any requirements (e.g., data types, structural requirements, validity standards, etc.) of the target system. The transformation process may transform the data from the source system into a different format, a different structure, a different type, and the like, so that the data is in a proper format for querying and analysis within the target system. The data may also be cleaned. ETL software typically automates the entire process using tasks. For example, a batch of tasks can be executed to extract a chunk of data from the source system, transform it into a format of the target system, and load it into the target system.

When transferring and integrating data from a source system to a target system that stores data differently, the data must be transformed to fit into an environment of the target system. The transformations can be relatively simple, for example, just casting the type. However, in other situations, the process may require relatively complex transformations, for example, transforming a data payload from an object representation (e.g., JSON format, etc.) into a hierarchical representation (e.g., as typically used by a relational database system, etc.) Handling these complex transformations often requires a significant amount of user involvement and overhead to ensure that the transformation process is correct.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The present application is directed to a host system such as a software application, host platform, and/or combination thereof, that can transfer data from a source system to a target system. In some embodiments, the host system described herein may be implemented within an Extract, Transform, and Load (ETL) software tool. During a transfer process, data can be extracted from the source system, transformed, and then outputted/loaded to a destination system (also referred to herein as a target system). According to various embodiments, the host system may transform the data using bytecode and a dedicate virtual machine. The virtual machine may be implemented as a register machine with a plurality of registers each configured to process an ETL transformation task in parallel. The virtual machine may convert the data that has been extracted from the source system into a format that is compatible with the target system based on the bytecode, prior to outputting the data to the target system.

In related process, transformations (such as filters and projections) can be pushed down to the respective source systems. While the example embodiments can be used for such workloads as well (e.g. when a source system isn't capable of performing the transformations), it can also be performed for "complex" data where the source data needs to be mapped from one complex schema to another, for example, from an object representation (e.g., Java, JavaScript, etc.) format into a hierarchical format of a relational database. When transferring the data in complex form, a whole new class of transformations becomes possible. For example, mapping multiple entities into a single target entity containing some fields from multiple source entities can be performed. In some embodiments, the transformation of complex data is often to map it to one or more related flat tables.

In the example embodiments, the term "complex data" or "complex schema" refers to data consisting of multiple interlinked "entities" that together form a business object. As an example, a person entity may be linked to a geographical address entity and a telephone number entity within a target system such as a relational database. In this example, each entity may have its own table in a database. Related transformation approaches may transform the entities into hierarchical/flat representations within the source system prior to transferring the data to the target database. However, as part of this process, each of the entities are transferred separately. As a result, there is a period of time where the target system is inconsistent and can produce inconsistent results.

In contrast, in the present application, the host system may transfer the logic for the transformations (bytecode) outside of the source system thereby enabling the transformations on complex data to be performed simultaneously and loaded into the target system simultaneously thereby avoiding any temporary inconsistencies in the data stored within the target system in comparison to the source system. According to various embodiments, the host system may include a compiler in combination with a dedicated virtual machine to perform the transformations. For example, the compiler may receive a model (e.g., a declarative model of the transformation logic) for transforming the data from the source system into a format of the target system. The model may be in a file such as a JavaScript Object Notation (JSON) file and may include a description of what should happen rather than how it should happen. The compiler may compile the model into bytecode. The bytecode may be stored in a repository and accessed by the virtual machine when executing the respective work orders.

A transfer of data from the source system to the target system may be configured by a user via the host system. For example, a user may generate a task that includes a unit of work including an identifier of source data to be extracted from a source system, a necessary transformation model, and an identifier of where the transformed data is to be stored in a target system. The host system may include an order processor that divides the task into a batch (plurality) of work orders. In some cases, the number of work orders may be in the hundreds, thousands, etc. The work order can identify a payload of data (e.g., a small subset or range of the total source data, etc.) to be transformed. Furthermore, the work order may include the bytecode to be used to perform the transformation. The work order may be submitted to the virtual machine. In response, the virtual machine may read the work order and execute the identified bytecode on the payload of data to transform the data into a format of the target system. The virtual machine may then return the transformed data to the host system which delivers the transformed data to the target system.

Another benefit of the example embodiments is that the virtual machine may include or otherwise be associated with a cache or other fast memory storage for temporarily holding the bytecode of a processed task. For example, the virtual machine may cache a bytecode for temporary purposes. A batch of tasks for transforming data from a format of the source system to a format of the target system may be broken up into multiple work orders with multiple payloads of data that rely on the same bytecode. The ETL software often schedules these batches in a sequence/row of work orders. During this process, the host system may submit the bytecode to the virtual machine during a first/initial work order associated with the batch. When the bytecode is received by the virtual machine, the virtual machine may cache the bytecode on a temporary basis (or store an identifier of the bytecode). If the next work order is to be processed using the same bytecode, the next work order does not need to include the bytecode again. Instead, the virtual machine can use the bytecode from the cache to process the transformation. This saves the virtual machine from having to load the bytecode from the host system thereby increasing the efficiency and the speed of the transformation process even more.

Furthermore, transformation steps are typically modelled by hand (e.g., by a developer). For example, program code may be written to perform the transformations. This code can be compiled and included in a replication engine, either directly or via a linked library. As another example, a transformation model can be stored in a suitable format (e.g. in JSON format) and can be used by dynamic code at runtime (i.e., code that interprets the model at runtime to apply the described transformations, etc.) The first example is the most performant, but also the least flexible. The code can be optimized for the specific tasks, but all transformations must be known in advance as they're baked into the engine and therefore static. The second example is more flexible but requires significantly more time. By interpreting the model at runtime, it is possible to change the transformations at any time. However, this comes at a significant performance cost, as the model needs to be interpreted for each business object that is processed.

The example embodiments provide a new approach for transforming data during an ETL transformation process. In particular, a dedicated VM (virtual machine) provides data transformation "primitives" in combination with a compiler that translates the transformation model into instructions for this VM automatically whenever the model changes. One of the benefits of this approach is that it provides the flexibility of being able to change the model at any time, while providing performance close to handwritten transformation code. The performance comes from using bytecode in place of the transformation logic/model that is provided by the developer. A compiler of the host system may convert the transformation model into bytecode that can be executed by the virtual machine when performing the transformation tasks as part of the larger ETL process.

The system may include a repository of ETL tasks, a scheduler that divides the ETL tasks into self-contained work orders and a generic runtime to process these work orders. When data is required in a different system (e.g. combining data from one or more sources to be loaded into one or more targets, etc.), an ETL software application can extract the data, transform the data in a use-case specific manner and eventually load the transformed data into the target system. The scheduler may generate and assign work orders to an available runtime instance where the work order is processed.

Each runtime instance may include components/modules for processing an ETL transformation task. The runtime instance may include an extract/reader module, a transform module, and a loader/writer module. The example embodiments introduce a virtual machine within the transformation module of the runtime instance. The virtual machine can process a work order and transform data from the source system into a format of a target system based on transformation logic that has been converted into bytecode. During the transformation process, the virtual machine may map a complex object from the reader to multiple flat tables that are sent to a writer for loading into the target system.

Furthermore, when a transformation model is updated in the repository the host system can automatically compile the updated model into bytecode and store it in a model repository of the host system. When the scheduler generates a work order, it includes the updated bytecode in the order. The transformation module takes the bytecode program from the work order and executes it, transforming the batch of input data to the requested output data. In principle, the bytecode program could change for each work order that is processed, but in practice this doesn't happen very often as the controller tries to execute work orders for the same ETL task on the same runtime instance. This means the transform module can cache the bytecode program for many consecutive batches of data thereby reducing the number of times the bytecode is loaded into the virtual machine thereby increasing efficiency of the system.

Figure 1A:
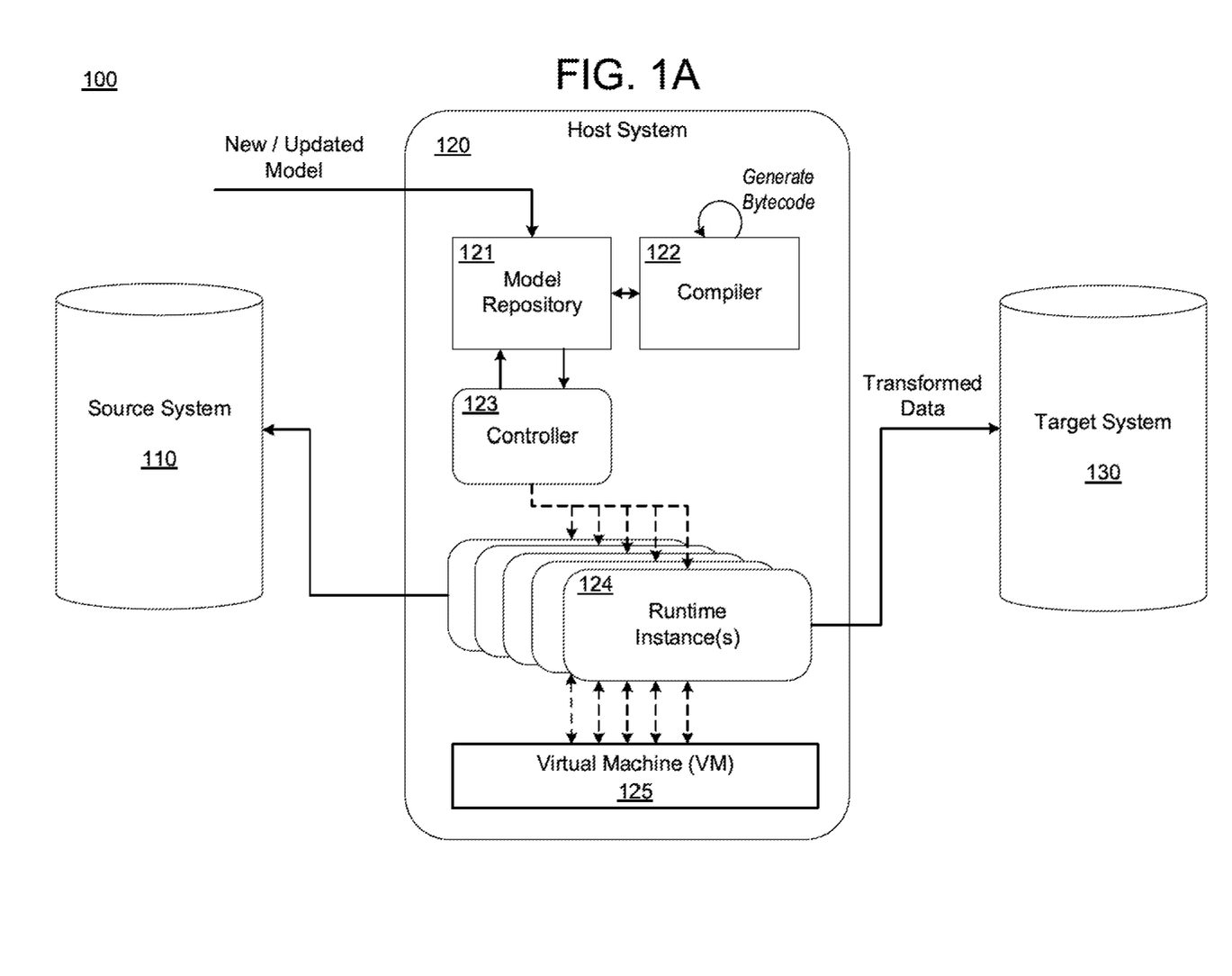
FIG. 1A is a diagram illustrating a computing environment which includes a host system for transferring data from a source system to a target system in accordance with an example embodiment.

FIG. 1A illustrates a computing environment 100 which includes a host system 120 for transferring data from a source system 110 to a target system 130 in accordance with an example embodiment. Referring to FIG. 1A, the source system 110 and the target system 130 may have different storage schemas that require transformation of some kind. For example, the source system 110 may be an object-based storage system such as a data store managed by a cloud platform, and the target system 130 may be a database such as a relational database. The types of systems are not limited and may include data warehouses, databases, data lakes, and the like.

In order for data extracted from the source system 110 to be compatible with queries and other processes within the target system 130, the data must be transformed in some way. The transformations may include changing data types, changing names of tables, and the like. It should also be appreciated that the transformations may include more complex changes such as changing data that is in an object-based format such as JavaScript Object Notation (JSON) into a hierarchical-based format such as commonly used in relational databases. Such changes may include converting the object-based code into flat/table data that is stored in rows and columns and that is linked to other tables via keys such as primary keys and foreign keys.

In the example of FIG. 1A, a new model for transforming data from a format of the source system 110 into a format of the target system 130 is stored within a model repository 121 of the host system 120. In response, the host system 120 may execute a compiler 122 which converts the model into bytecode. As an example, the model may be generated using an ETL software application and may include a JavaScript Objection Notation (JSON) file with a declarative model of the transformation logic stored therein. For example, the declarative model may be generated by a user via a graphical user interface. For example, the user may use an input mechanism to drag two boxes onto a workspace (one for the source, one for the target) and connect them with an arrow. It is then up to the software to interpret this is a meaningful way. The compiler 122 may convert the model stored within the JSON file into bytecode that is capable of interpretation by a virtual machine. The bytecode may be stored within the model repository 121. In some cases, the bytecode may be stored in place of the original model (and the original model may be deleted, etc.) As another example, the bytecode may be stored with a pointer to the original model.

A controller 123 of the host system 120 may trigger a transfer process of data from the source system 110 to the target system 130. For example, the transfer process may be triggered by a condition (e.g., periodic), on-demand (e.g., a user pressing an input button, etc.), in responses to a condition, and the like. As another example, the transfer may be triggered by a user selecting a range of data from the source system 110 via a user interface, or the like. In response, the controller 123 may generate work orders for processing the transfer. The work orders may include a payload of data from the source system 110 which is to be converted into a format of the target system 130. The controller 123 may schedule the work orders for processing. For example, each work order may be processed via its own runtime instance. Accordingly, for a batch (plurality) of work orders, a batch of runtime instances 124 can be generated by the controller 123 for processing the batch of work orders.

During processing, each runtime instance 124 may extract a different payload from the source system 110, transform it using the bytecode, and load it into the target system 130. As further described herein with respect to FIGS. 2A-2C, the runtime instances 124 may interact with a virtual machine 125 to perform the transformation of the source data. Here, the virtual machine 125 may include a register machine with a plurality of registers as further described in the example of FIG. 3. Each register may process a different work order/runtime instance 124. For example, the virtual machine 125 may read a payload of data and the bytecode from a work order associated with a runtime instance 124 and execute the bytecode on the payload of data to transform it into a format of the target system 130. The virtual machine 125 may return the transformed data back to the runtime instance 124 which can subsequently load the transformed data into the target system 130.

Multiple tasks (i.e., a batch) may be needed to perform the transfer process in an efficient manner. To conserve more time and be more efficient, the virtual machine 125 may include a cache as further described below with respect to FIG. 1C. The virtual machine 125 may cache bytecode that it receives and continue using the bytecode from the cache on subsequently scheduled work orders. For example, a transfer process may be broken up into ten transformation tasks requiring a batch of ten work orders. The first task scheduled by the controller 123 may include a first payload of data from the source system 110 and a copy of the bytecode. The virtual machine 125 may use the bytecode from the work order on the first payload and cache the bytecode for the remaining nine work orders. As a result, the controller 123 does not need to include the bytecode in subsequent work orders associated with the same batch. And likewise, the virtual machine 125 does not need to load the bytecode for each of the remaining nine work orders. Instead, the virtual machine 125 can execute the bytecode that is stored in the cache. This results in a significant savings of time when processing the remaining nine work orders.

Figure 1B:
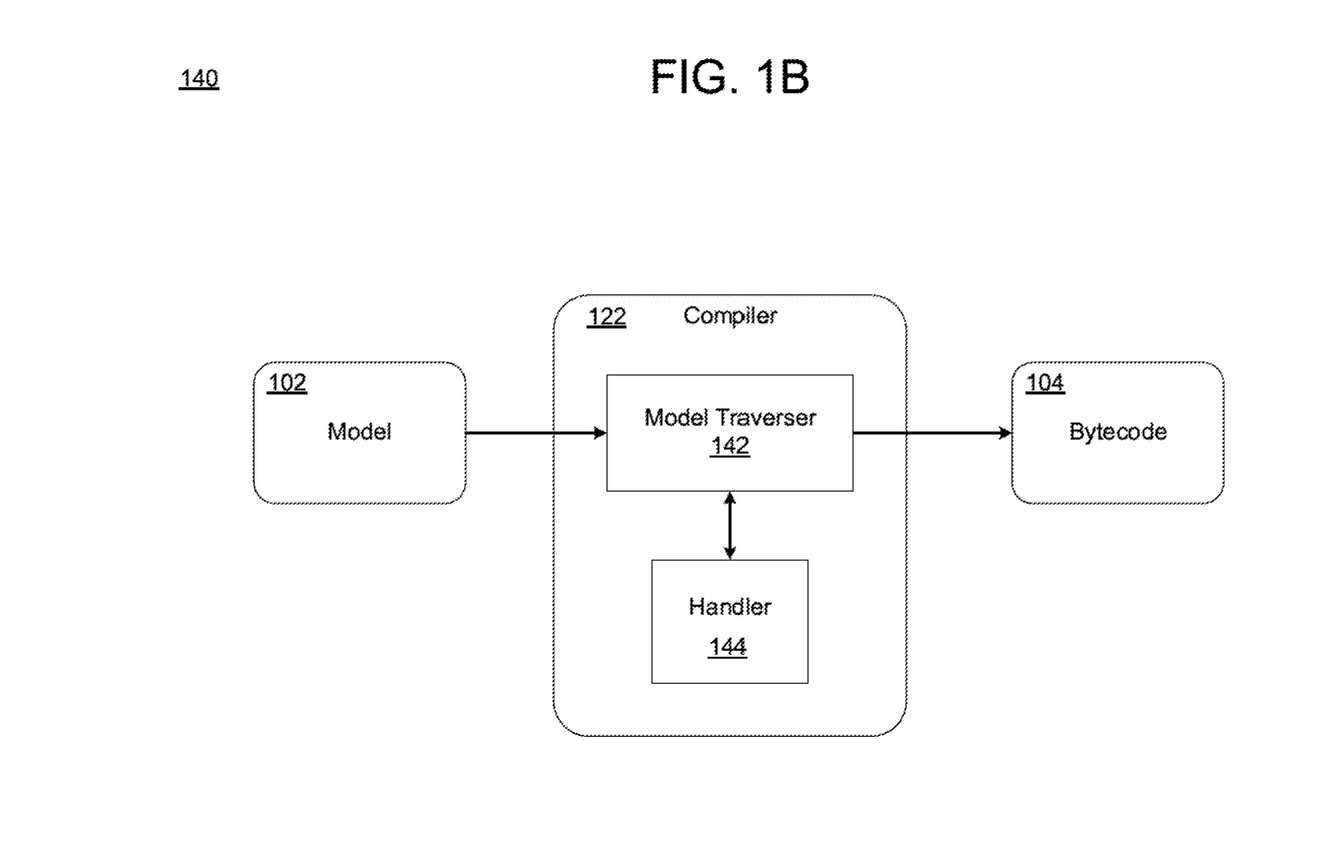
FIG. 1B is a diagram illustrating a compiler of the host system for transforming data in accordance with an example embodiment.
Figure 1C:
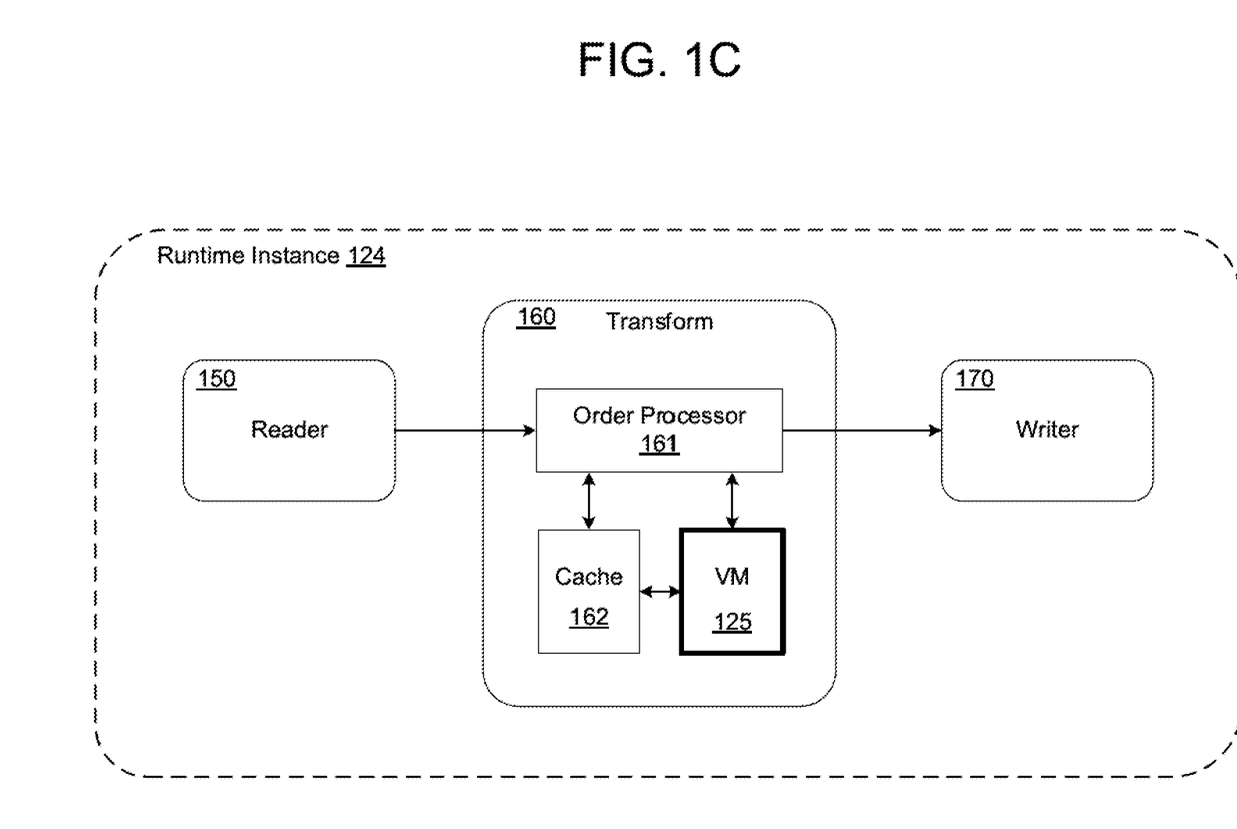
FIG. 1C is a diagram illustrating a runtime instance of a transformation process that relies on a dedicated virtual machine (VM) in accordance with an example embodiment.

FIG. 1B illustrates an example of an architecture 140 of the compiler 122 of the host system 120 shown in FIG. 1A, in accordance with an example embodiment, and FIG. 1C illustrates an example of a runtime instance 124 that relies on the virtual machine 125 in accordance with an example embodiment. Referring to FIG. 1B, the compiler 122 generates bytecode for processing by the virtual machine 125 in FIG. 1A. The compiler itself is not material to the example embodiments, and it should be appreciated that any compiler can be used.

Figure 2A:
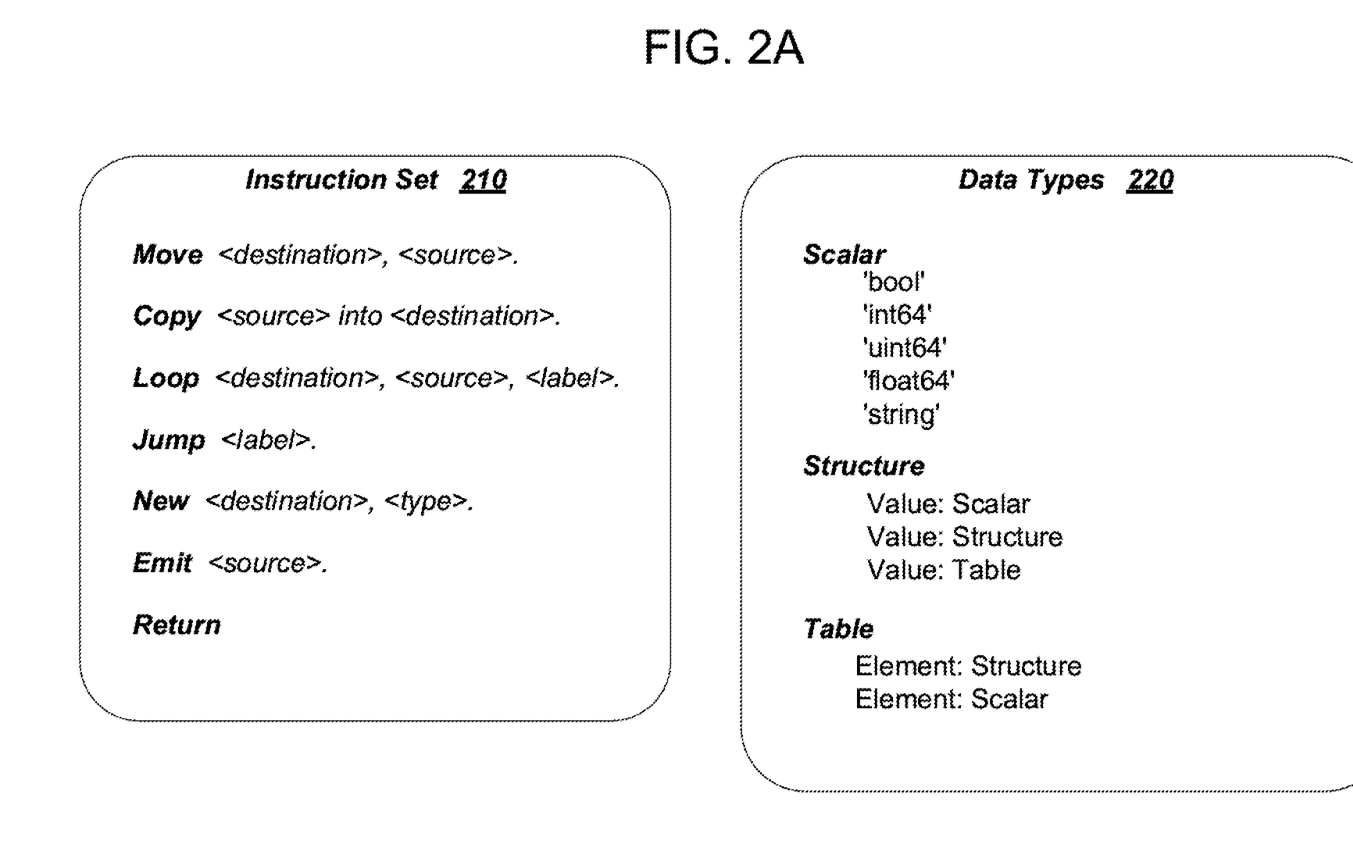
FIG. 2A is a diagram illustrating an example of instructions and data types that can be used by the compiler to generate bytecode in accordance with an example embodiment.
Figure 2B:
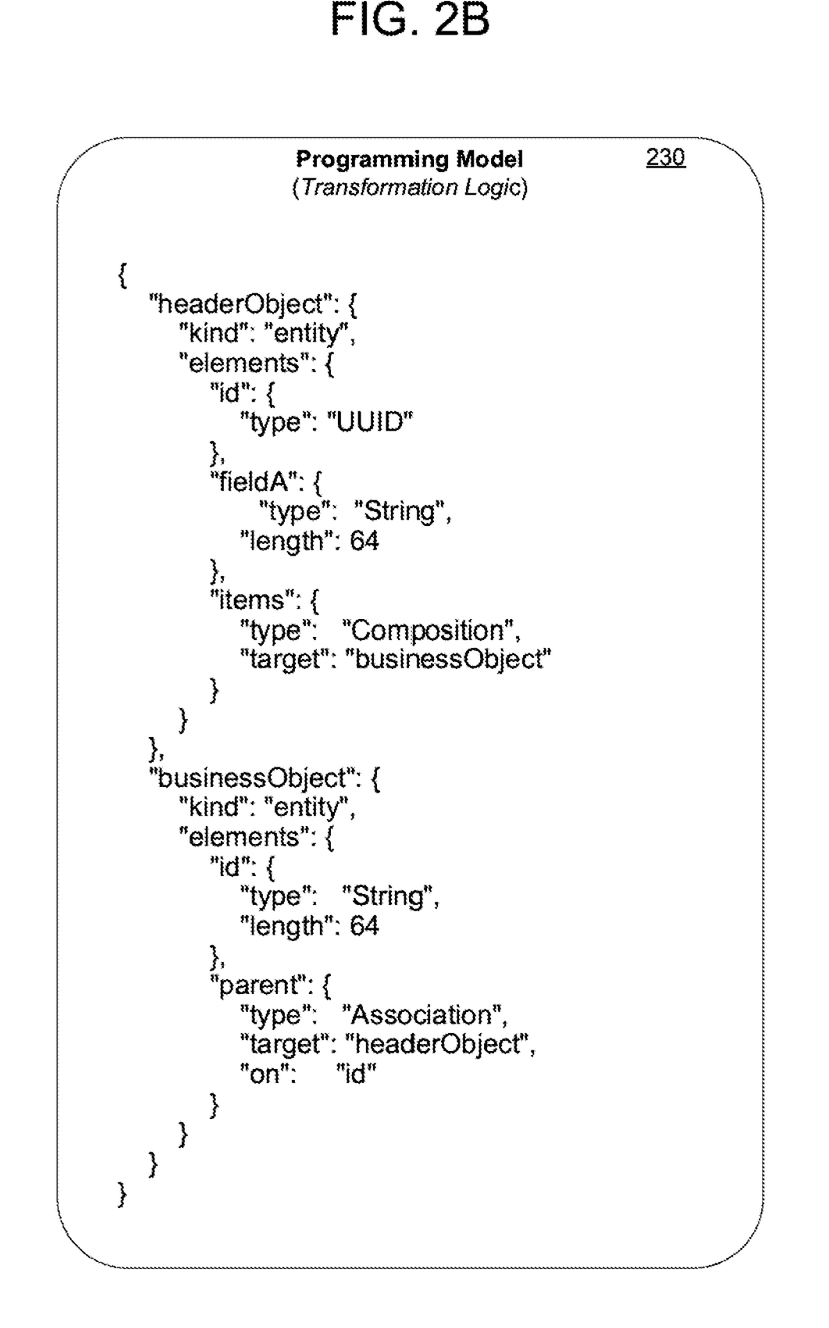
FIGS. 2B-2C are diagrams illustrating a process of compiling programming code into bytecode using the instructions and the data types described in FIG. 2A in accordance with example embodiments.

In the example of FIG. 1B, the compiler 122 can include a model traverser 142 that is capable of traversing a transformation model 102 that contains logic therein for transforming data from a format of the source system 110 into a format of the target system 130. The model traverser 142 may traverse the elements within the transformation model 102. During the traversal, a handler 144 may be invoked to generate a bytecode instruction for a current element being traversed by the model traverser 142. An example of the instruction set that can be used by the compiler 122 when generating the bytecode instruction are shown in FIG. 2A. Meanwhile, an example of a transformation model 102 is shown in FIG. 2B. After the compiler has processed the transformation model 102 in its entirety, a bytecode 104 program can be generated and stored within the model repository 121 shown in FIG. 1A or another repository that is not shown.

Referring to FIG. 1C, when a work order is processed, the controller 123 may generate a runtime instance 124 which includes a reader module 150 for reading data from the source system 110 and a writer module 170 for writing data to the target system 130. In addition, the controller 123 may launch a transform module 160 that interacts with the virtual machine 125 to perform the transformations of the data read by the reader module 150 but before it has been written by the writer module 170. For example, an order processor 161 may read the next scheduled work order (e.g., from a queue, list, etc.) including a next payload of data, and invoke the virtual machine 125 to transform the payload of data using the bytecode. The transformed data may be passed back from the virtual machine 125 to the order processor 161, when then forward the transformed data to the writer module 170 for loading into the target system 130. In addition, virtual machine 125 may include or otherwise be associated with a cache 162 for caching bytecode received from the work orders.

FIG. 2A illustrates an example of instructions 210 and data types 220 that can be used by the compiler to generate bytecode in accordance with an example embodiment. Referring to FIG. 2A, the instructions 210 include a move instruction, a copy instruction, a loop instruction, a jump instruction, a new instruction, an emit instruction, and a return instruction. Meanwhile, the data types 220 include scalers, structures, and tables.

As an example, the move instruction from the instructions 210 may be used to copy a data value from one register to another. If either the source or the destination register contains a complex value (e.g., an array, an object, etc.), the index functionality can be used to get a specific element from that complex value. Instead of a source register, the system may use a native function (e.g., to generate a unique value, etc.) that is then stored in the destination register. The loop instruction may be used to iterate over all items in an array to enable the same transformation to be applied to each item. Here, the source register contains an array and each time the loop instruction is executed, a next element from the array is assigned to the destination register. If there are no more items, a jump instructions may be used to conditionally or unconditionally jump. The new instruction may create a new record of <type> and assign it to the destination register. The emit instruction may emit a new record to a function result collector, and the return instruction may return from a function.

The target of the transformation is typically a set of flat tables. When the transformation is started, a "collector" is initialized for the target, consisting of a set of 'type' to list of records. The new instruction specifies the name of one of these types and sets the destination register of the virtual machine to an empty record of that type. Subsequent instructions then populate the fields within that record until it is eventually emitted using the emit instruction. Emitting the record adds it to the list of records for the corresponding type. Once the transformation finishes, all the collected records for the various target tables are sent to the writer module 170 shown in FIG. 1C as a single batch that is written to the target system in a single transaction.

Figure 2C:
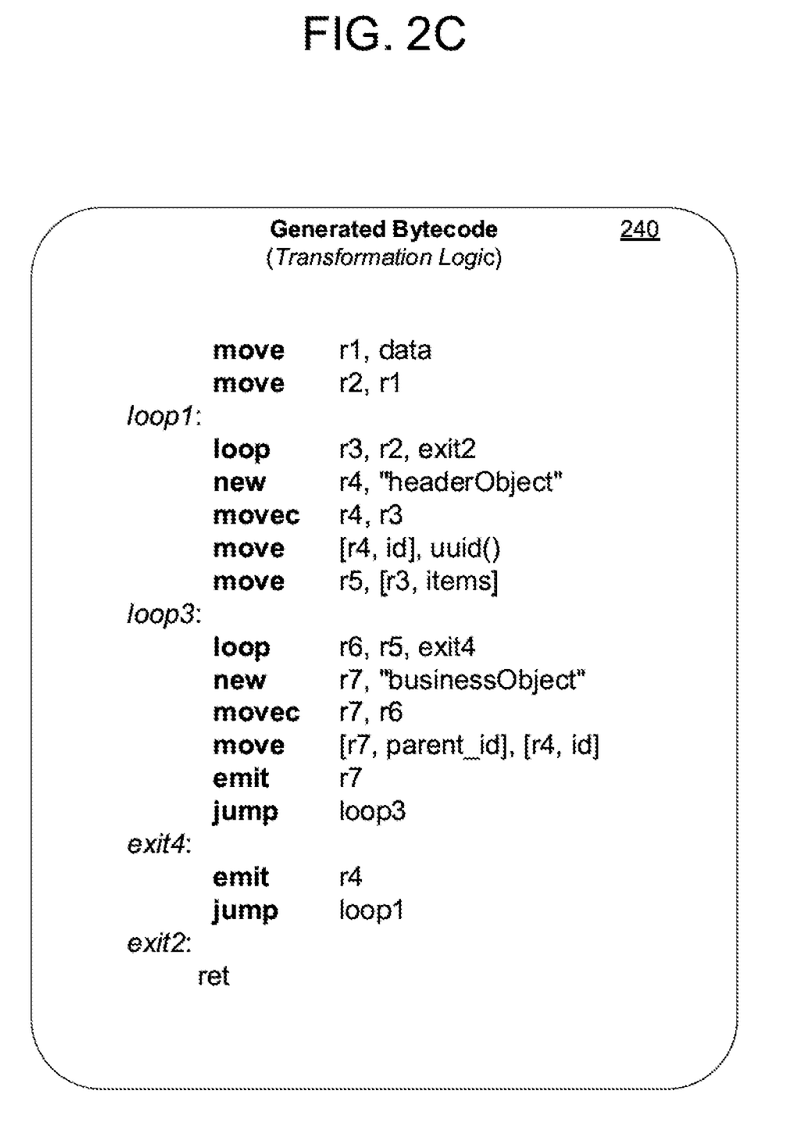

FIGS. 2B-2C are diagrams illustrating a process of compiling programming code into bytecode using the instructions and the data types described in FIG. 2A in accordance with example embodiments. Referring to FIG. 2B, an example of a programming model 230 is shown with transformation logic therein for transforming data from a format of a source system into a format of a target system. The programming model 230 may be a declarative model in an object representation such as a JavaScript Object Notation (JSON) file or the like. Here, the programming model 230 contains objects of code/content in human-readable text/form such as Java, JavaScript, and the like.

Using the instructions 210 and the data types 220 shown in FIG. 2A, a compiler may convert the programming model 230 (e.g., the declarative model) into bytecode 240 that is shown in FIG. 2C. The bytecode 240 is binary code that includes a sequence of instructions that can be interpreted by the virtual machine to carry out a transformation of a data payload from a format of the source system to a format of the target system. The representation of the bytecode in FIG. 2C is a human-readable representation of the binary code.

The transformation process of transforming the programming model 230 into the bytecode 240 may be performed by the compiler and the virtual machine described herein then executes the bytecode generated by the compiler. According to various embodiments, the virtual machine described herein may be implemented as an "infinite" register machine with registers supporting arbitrary data types (including tables and objects). This choice isn't material to the solution and other options (such as a stack machine) are also possible. The virtual machine is not a general purpose VM for a number of reasons including ensuring malicious programs can't cause harm to the system, guaranteeing that all programs will terminate, and for simplicity. The virtual machine can be a dedicated to performing only one task requiring only a handful of instructions.

By using the virtual machine, the system is able to provide a set of powerful primitives that are implemented in native code (and therefor are very fast) that can be combined in various ways to accomplish all the necessary transformation tasks. While the virtual machine conceptually uses registers, the registers aren't shared between different threads of execution or between different transformation function calls within the same thread. This means that bytecode programs only need to consider their own register usage and do not need to handle memory allocation and deallocation.

Figure 3A:
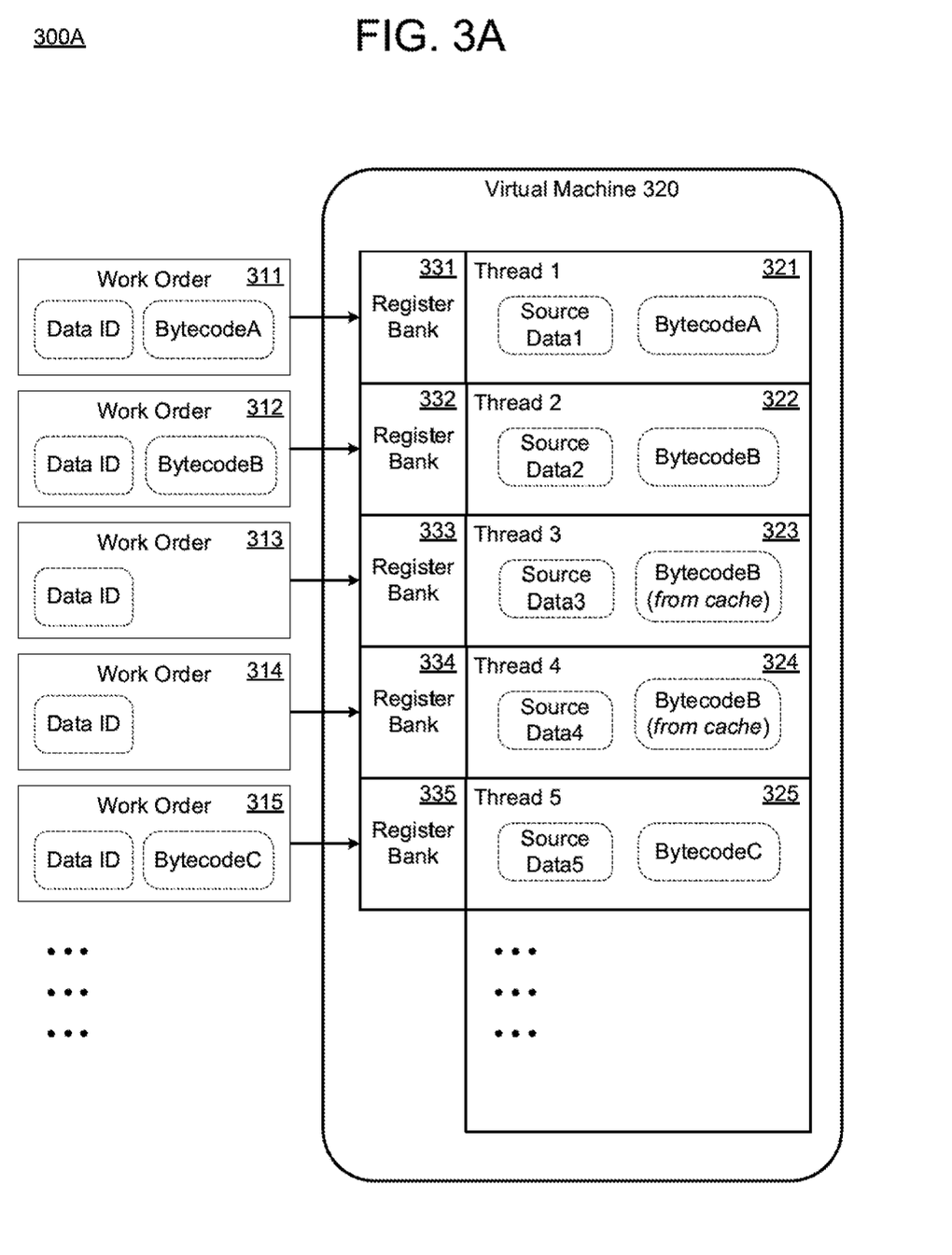
FIG. 3A is a diagram illustrating a process of a virtual machine processing transformations in accordance with an example embodiment.

FIG. 3A illustrates a process 300A of a virtual machine 320 processing transformations in accordance with an example embodiment. Referring to FIG. 3A, a transfer task from a source system to a target system may be broken up into a plurality of work orders including work orders 311, 312, 313, 314, and 315 that can be processed in parallel (e.g., simultaneously, etc.) via the virtual machine 320 using a plurality of threads 321, 322, 323, 324, and 325, respectively. Each thread 321, 322, 323, 324, and 325 has its own register bank 331, 332, 333, 334, and 335, respectively, within the virtual machine 320. The virtual machine 320 may be considered an infinite register machine because the virtual machine 320 may generate enough registers within a register bank of a thread to process the data for a single work order. That is, the virtual machine 320 may dynamically create an amount of registers that are necessary for processing a batch of ETL work orders at the same time. Thus, multiple work orders can be processed in parallel/simultaneously by the virtual machine using the plurality of threads 321, 322, 323, 324, 325, etc.

Figure 3B:
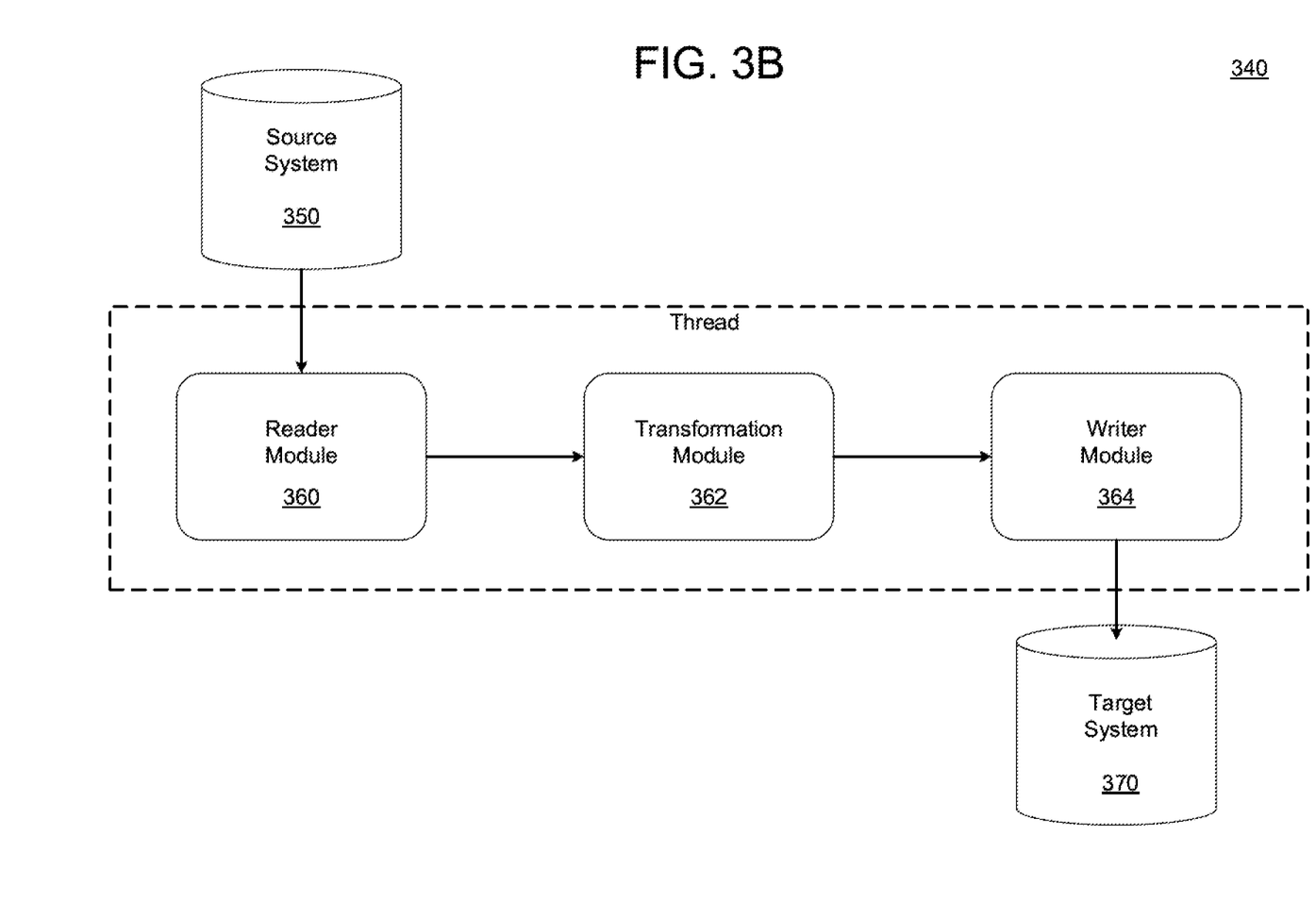
FIG. 3B is a diagram illustrating a thread of the virtual machine executing an ETL process in accordance with an example embodiment.

FIG. 3B illustrates a process 340 of a thread of the virtual machine 320 executing an ETL process in accordance with an example embodiment. Referring to FIG. 3B, each thread within the virtual machine 320 shown in FIG. 3A may execute a reader module 360, a transformation module 362, and a writer module 364. For example, a work order may identify a payload of data to be read from a source system 350. The identifier may be data identifiers or some other range of data. The reader module 360 may use the data identifiers to locate the data in the source system 350 and extract the data into the thread. The extracted data is then sent to the transformation module 362 which executes the bytecode (from the work order) on the extracted data to generate transformed data. The transformed data is then sent to the writer module 364 which writes the transformed data to a target system 370. The three modules (i.e., reader module 360, transformation module 362, and writer module 364) may be performed at the same time in a single step. However, as another example, the three modules may be performed at separate times as separate steps.

Referring now to FIG. 3A, the work order 311 includes a bytecode A and identifies a first payload of data from the source system 350. Here, a thread 321 of the virtual machine 320 may execute the modules shown in FIG. 3B to extract the payload of data, execute the bytecode A on the payload of data to generate transformed data, and write the transformed data to the target system 370. A work order 312 identifies a second payload of data for processing and a second bytecode (bytecode B). The thread 322 may execute the work order 312 in parallel with the thread 321 executing the work order 311. Here, the thread 322 may execute the modules shown in FIG. 3B to extract the payload of data from the source system 350, transform the payload of data via execution of the bytecode B, and write the transformed payload of data to the target system 370.

A work order 313 includes an identifier of a third payload of data, but does not include bytecode. Here, the virtual machine 320 may understand that the bytecode to be used for processing the third task is the same bytecode that was just used to process the work order 312. Here, the virtual machine 320 may cache the bytecode B when processing the work order 312. Accordingly, the cached bytecode B can be pulled from the cache after receiving the work order 313. Accordingly, the work order 313 does not include the bytecode B. Instead, the virtual machine can load the bytecode B from the cache and execute it within a thread 323 on the third payload of data from the work order 313. Likewise, work order 314 may also rely on bytecode B and may be processed via a thread 324 in the same manner as the work order 313 is processed by the thread 323. That is, the bytecode B can be loaded from cache and used to transform a fourth payload of data into a format of the target system 370 and written to the target system 370.

A work order 315 includes a new bytecode (bytecode C) to be used by the virtual machine 320 to perform the transformation. The virtual machine 320 may cache the bytecode C (and possibly delete a previously cached bytecode B to make room, etc.) The virtual machine 320 may also execute the bytecode C on a fifth payload of data identified by the work order 315 via a thread 325. When registers finish processing a task, they can be reused by additional tasks.

Figure 4:
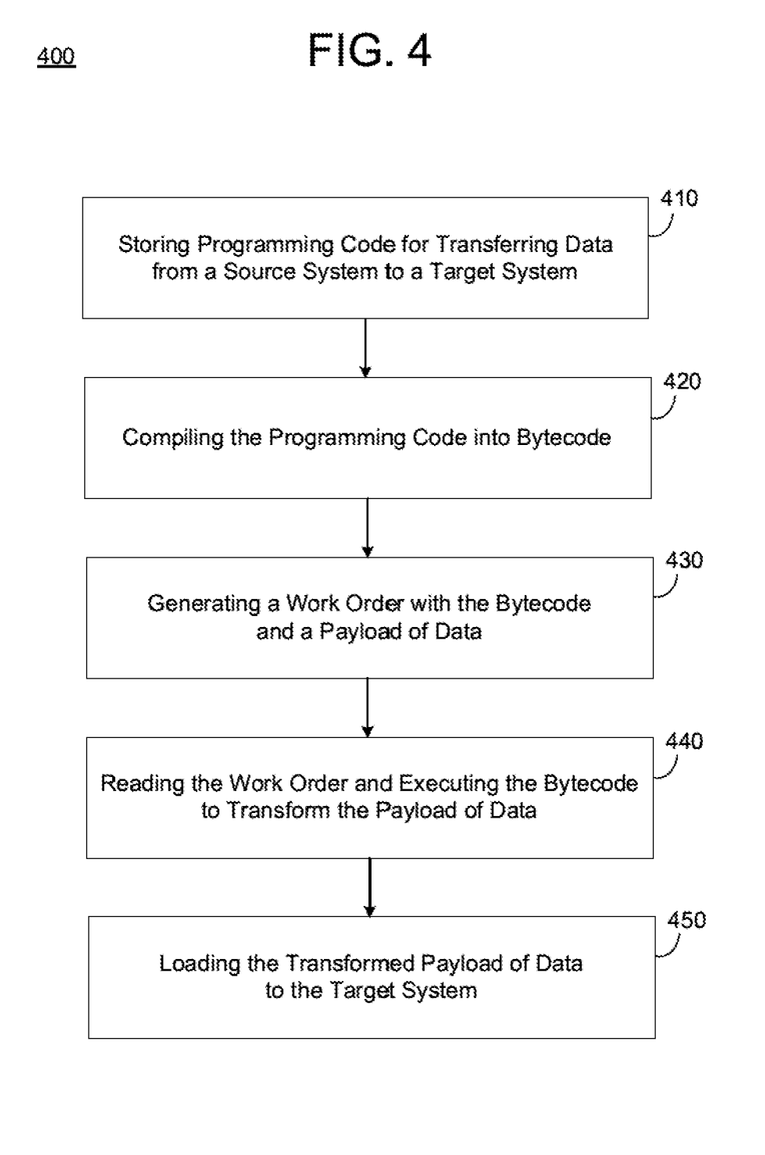
FIG. 4 is a diagram illustrating a method of transforming data in accordance with an example embodiment.

FIG. 4 illustrates a method 400 of transforming data in accordance with an example embodiment. As an example, the method 400 may be performed by a database, a cloud platform, a web server, an on-premises server, a user device, a combination of devices, and the like. The method 400 may be an automated method that is performed by a software application such as a software application or suite of applications that perform ETL operations for transferring data from a source system to a target system. Referring to FIG. 4, in 410, the method may include storing programming code which comprises logic for transforming data from a source format of a source system where the data is extracted to a target format of a target system. As an example, the programming code may include JavaScript, Java, C++, Python, and the like.

In 420, the method may include compiling the programming code into bytecode. In 430, the method may include generating a work order which includes a payload of data from the source system and the bytecode. In 440, the method may include reading the work order via a virtual machine and executing the bytecode on the payload of data via the virtual machine, wherein the virtual machine transforms the payload of data from the source format to the target format based on the bytecode. In 450, the method may include loading the transformed payload of data into the target system.

In some embodiments, the executing via the virtual machine causes the payload of data to be transformed from an object format of the source system to a relational database format of the target system. In some embodiments, the virtual machine may include a cache, and the method further comprises storing the bytecode from the work order within the cache. In some embodiments, the method may further include reading a next work order with a next payload of data in the source format via the virtual machine, and executing the bytecode stored in the cache on the next payload of data to transform the next payload of data from the source format to the target format.

In some embodiments, the virtual machine may include a register machine that includes a plurality of registers. In some embodiments, the method may further include receiving, via the virtual machine, a plurality of work orders comprising a plurality of payloads of data in the source system format, and executing a bytecode included in the plurality of work orders on the plurality of payloads of data within the plurality of registers, respectively, via the virtual machine. In some embodiments, the compiling may be performed via a compiler that comprises an instruction set that includes a move instruction for moving data from the source system to the target system and a loop instruction for iterating to a next work order. In some embodiments, the compiling may include converting objects of code within a programming language of the programming code into the bytecode via the move instruction and the loop instruction within the instruction set.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
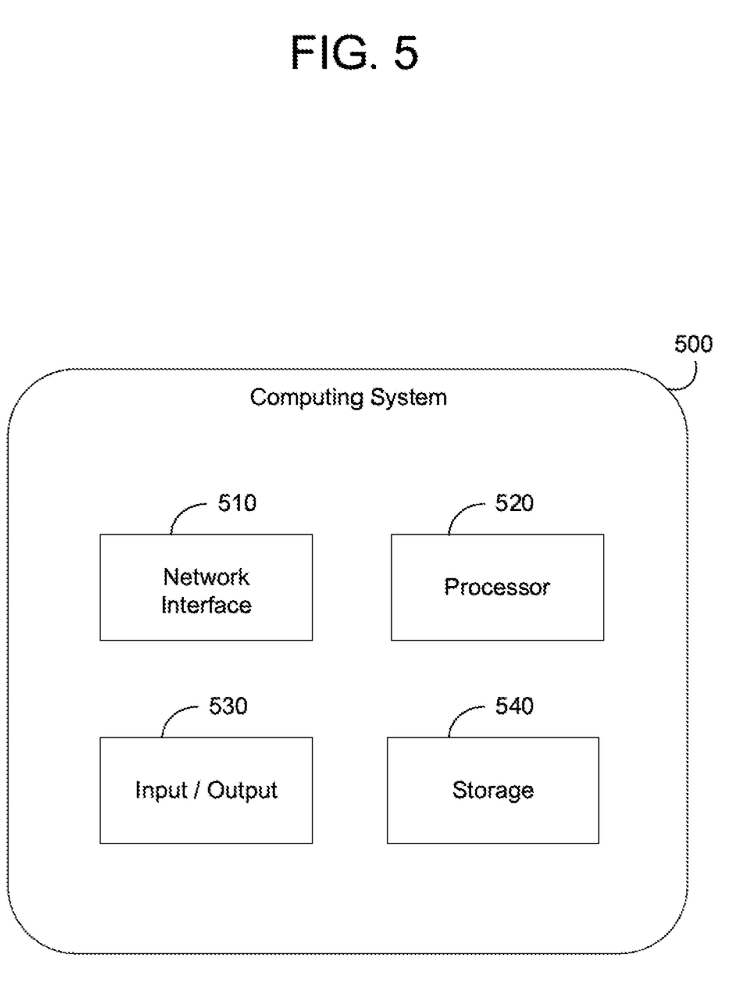

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computing system 500 which may process or be integrated in any of the above-described examples, etc. As just one example, the computing system 500 may be the host system 120 shown in FIG. 1A with the other elements shown in FIG. 1A such as the virtual machine omitted for brevity. FIG. 5 is not intended to suggest any limitation as to the scope of use or functionality of embodiments described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 500 may be a tokenization platform, server, CPU, or the like.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 5, the computing system 500 is shown in the form of a general-purpose computing device. The components of computing system 500 may include, but are not limited to, a network interface 510, a processor 520 (or multiple processors/cores), an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage device 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, the storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the storage device 540 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

In the example embodiments, the storage device 540 may include a memory that is configured to store a file comprising a description of an application programming interface (API). The processor 520 may be configured to transform the description of the API (which is operation-centric) into a graph API which is entity-centric. For example, the processor 520 may identify operations performed by the API from the description of the API. The processor 520 may determine a plurality of entities associated with the actions performed by the API and relationships among the plurality of entities. The processor 520 may generate a graph model of the API which comprises a plurality of nodes representing the plurality of entities and edges between the plurality of nodes which represent the relationships between the plurality of entities. The processor 520 may store the graph model of the API in the memory of the storage device 540. Furthermore, the processor 520 may receive queries from software applications and use the transformed graph API to respond to the queries instead of the traditional operation-centric API.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage, of a host system, configured to store a model with logic for transforming data from a source format of a source system to a target format of a target system;
   a compiler of the host system configured to compile the model into bytecode via a compiler;
   a processor of the host system configured to generate, via a scheduler, a work order that includes a payload of data from the source system to be transformed and the bytecode complied by the compiler to be used to perform a transformation of the payload of data; and
   a virtual machine configured to read the work order submitted to the virtual machine and, in response, execute the bytecode on the payload of data, the virtual machine dedicated to transforming the payload of data from the source format to the target format based on the execution of the bytecode and returning the transformed payload of data to the host system, wherein the processor of the host system is further configured to load the transformed payload of data into the target system.

2. The computing system of claim 1, wherein the virtual machine is configured to transform the payload of data from an object format of the source system to a relational database format of the target system.

3. The computing system of claim 1, wherein the virtual machine is associated with a cache, and the processor is configured to store the bytecode from the work order within the cache for use with subsequent work orders processed by the virtual machine.

4. The computing system of claim 3, wherein the virtual machine is configured to read a next work order with a next payload of data in the source format, and execute the bytecode stored in the cache on the next payload of data to transform the next payload of data from the source format to the target format.

5. The computing system of claim 1, wherein the virtual machine comprises a plurality of threads each configured to execute a reader module, a transformation module, and a writer module.

6. The computing system of claim 5, wherein the virtual machine is configured to receive a plurality of work orders comprising a plurality of payloads of data in the source system format, and execute the plurality of work orders on the plurality of payloads of data via the plurality of threads, respectively.

7. The computing system of claim 5, wherein a thread includes its own dedicated register bank, and the virtual machine is further configured to dynamically generate an amount of registers within the register bank based on a work order assigned to the thread.

8. The computing system of claim 1, wherein the compiler comprises an instruction set that includes a move instruction for moving data between registers in the virtual machine and a loop instruction for iterating to a next element in an array of source data.

9. A method comprising:
   storing, by a host system, a model with logic for transforming data from a source format of a source system to a target format of a target system;
   compiling, by a compiler of the host system, the model into bytecode;
   generating, via a scheduler of the host system, a work order that includes a payload of data from the source system to be transformed and the bytecode complied by the compiler to be used to perform a transformation;
   reading the work order via a virtual machine and, in response, executing the bytecode on the payload of data via the virtual machine, the virtual machine dedicated to transforming the payload of data from the source format to the target format based on the execution of the bytecode and returning the transformed payload of data to the host; and
   loading, by the host system, the transformed payload of data into the target system.

10. The method of claim 9, wherein the executing via the virtual machine causes the payload of data to be transformed from an object format of the source system to a relational database format of the target system.

11. The method of claim 9, wherein the virtual machine is associated with a cache, and the method further comprises storing the bytecode from the work order within the cache for use with subsequent work orders processed by the virtual machine.

12. The method of claim 11, wherein the method further comprises reading a next work order with a next payload of data in the source format via the virtual machine, and executing the bytecode stored in the cache on the next payload of data to transform the next payload of data from the source format to the target format.

13. The method of claim 9, wherein the virtual machine comprises a plurality of threads each configured to execute a reader module, a transformation module, and a writer module.

14. The method of claim 13, wherein the method further comprises receiving, via the virtual machine, a plurality of work orders comprising a plurality of payloads of data in the source system format, and executing the plurality of work orders on the plurality of payloads of data via the plurality of threads, respectively, via the virtual machine.

15. The method of claim 13, wherein a thread includes its own dedicated register bank, and the executing comprises dynamically generating an amount of registers within the register bank based on a work order assigned to the thread.

16. The method of claim 9, wherein the compiling is performed via a compiler that comprises an instruction set that includes a move instruction for moving data between registers in the virtual machine and a loop instruction for iterating to a next element in an array of source data.

17. A non-transitory computer-readable storage medium comprising instructions which when executed by a processor cause a computer to perform a method comprising:
- compiling, by a compiler of a host system, transformation logic into bytecode;
- generating, via a scheduler of the host system, a work order that includes a payload of data from a source system to be transformed and the bytecode complied by the compiler to be used to perform a transformation of the payload of data;
- reading the work order via a virtual machine and, in response, executing the bytecode on the payload of data via the virtual machine, the virtual machine dedicated to transforming the payload of data from a source format of the source system to a target format of a target system based on the executed bytecode and returning the transformed payload of data t the host system; and
- loading, by the host system, the transformed payload of data into the target system.

18. The non-transitory computer-readable medium of claim 17, wherein the executing via the virtual machine causes the payload of data to be transformed from an object format of the source system to a relational database format of the target system.

19. The non-transitory computer-readable medium of claim 17, wherein the virtual machine comprises a cache, and the method further comprises storing the bytecode from the work order within the cache.

20. The non-transitory computer-readable medium of claim 19, wherein the method further comprises reading a next work order with a next payload of data in the source format via the virtual machine, and executing the bytecode stored in the cache on the next payload of data to transform the next payload of data from the source format to the target format.

* * * * *